May 19, 1970 S. D. LOCKSHIN 3,512,834

METHOD AND MEANS FOR SECURING THE ENDS OF THE WEBBING MATERIAL TO THE FRAME OF GARDEN OR PORCH FURNITURE

Filed Dec. 22, 1967 5 Sheets-Sheet 1

INVENTOR.

SAMUEL D. LOCKSHIN

BY Joseph A. Pave

ATTORNEY.

INVENTOR.
SAMUEL D. LOCKSHIN
BY
Joseph A. Rave
ATTORNEY.

May 19, 1970 S. D. LOCKSHIN 3,512,834

METHOD AND MEANS FOR SECURING THE ENDS OF THE WEBBING MATERIAL TO THE FRAME OF GARDEN OR PORCH FURNITURE

Filed Dec. 22, 1967 5 Sheets-Sheet 3

INVENTOR.
SAMUEL D. LOCKSHIN

BY Joseph A. Rave
Attorney

May 19, 1970 S. D. LOCKSHIN 3,512,834

METHOD AND MEANS FOR SECURING THE ENDS OF THE WEBBING MATERIAL TO THE FRAME OF GARDEN OR PORCH FURNITURE

Filed Dec. 22, 1967 5 Sheets-Sheet 4

INVENTOR.

SAMUEL D. LOCKSHIN

BY Joseph A. Pava

Attorney

INVENTOR.
SAMUEL D. LOCKSHIN

BY Joseph A. Rave
Attorney

United States Patent Office 3,512,834

Patented May 19, 1970

3,512,834
METHOD AND MEANS FOR SECURING THE ENDS OF THE WEBBING MATERIAL TO THE FRAME OF GARDEN OR PORCH FURNITURE

Samuel D. Lockshin, Northampton, Mass., assignor to Shott Chairs Corporation, Hamilton, Ohio, a corporation of Ohio Filed Dec. 22, 1967, Ser. No. 692,794
Int. Cl. A47c 7/02
U.S. Cl. 297—441 14 Claims

ABSTRACT OF THE DISCLOSURE

The garden or porch chair and/or chaise are formed of aluminum or similar materials for the frame members and the ends of the webbing strips or lengths are retained in operative position by either a single retaining member cooperating with and securing an end of each strip of flexible webbing material or a single retaining member cooperating with and simultaneously securing all of the ends of the webbing material strips to an aluminum frame member.

SUMMARY OF THE INVENTION

In the past it has been customary to provide garden or porch type chairs and chaises with frame members of aluminum tubing which is provided with a series of drilled holes whose centers are equally spaced from one another and into which holes a holding clip, after being secured to or pushed through the webbing inwardly of the end thereof, are inserted. It has been found that the use of individual clips and its placement with respect to the tubing apertures consume a considerable amount of time which is added to the cost of the finished product.

An object of this invention is the provision of a means for effecting the securement of the webbing of garden or porch furniture ends to a frame member thereof which is considerably less expensive than that heretofore employed.

Another object of this invention is the provision of means for securing, successively, all of the opposite ends of the flexible webbing strips of garden or porch furniture which run in the same direction on the seat and back of a chair or chaise, simultaneously, to the improved frame members of said seat and/or back, and thereby save material at said opposite end of said flexible webbing strips.

A further object of this invention is the provision of means in the said garden or porch furniture which in assembling the so-called garden or porch furniture, including the improvements of this invention, whereby higher production is obtained, and wherefore an article of equal value can be produced and supplied at a saving in retail price or a far better product at the same retail price.

A still further object of the present invention is the provision of a garden or porch piece of furniture which due to the improvements of this invention affords a new look to the said product and, at the same time, a more sturdy product.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figures 1, 3, 4, 5, 6:
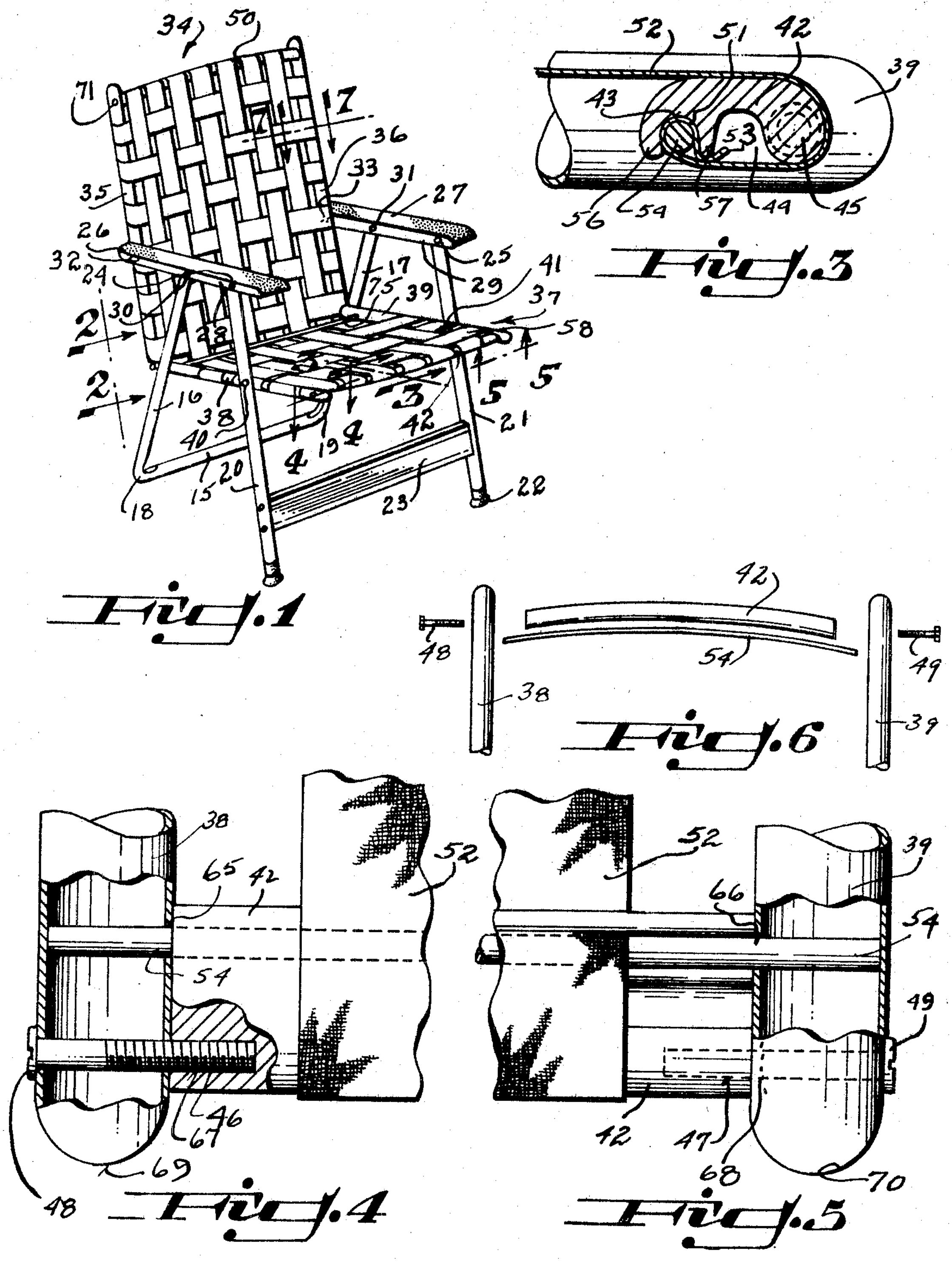
FIG. 1 is an elevational view of a chair of the garden or porch type in which frame members, generally aluminum are employed with longitudinal and transversely extending and interlaced fabric lengths and embodying the improvements of the present invention.
FIG. 3 is an enlarged, sectional view through the end of the chair seat in FIG. 1 as seen from line 3—3 on said FIG. 1; the attachment of the other ends of the said fabric strips to the top of the back of the chair back is a similar construction.
FIG. 4 is an enlarged, transverse, sectional view through one corner of the seat of FIG. 1 as seen on line 4—4 of said FIG. 1.
FIG. 5 is a view similar to FIG. 4 except looking in the opposite direction and as seen from line 5—5 on FIG. 1 and with certain parts in cross-section.
FIG. 6 is a view showing the parts of the web end fastening means in positions for assembly to one another and forming a detail of the invention.

As seen in FIG. 1 the garden or porch chair embodying the structure of the present invention comprises a rear supporting member or composite rear legs in the form a a U-shaped rear supporting member including a base or bottom 15 from the opposite ends of which upstand legs 16 and 17. The said legs 16 and 17 are connected with the base 13 by bends, respectively, 18 and 19 and which actually contact the surface on which the said rear supporting member rests. The said rear frame is therefore formed of a continuous piece of hollow tube of metal, generally aluminum.

A front supporting member or composite front leg comprising frame is provided which consists of a pair of depending legs 20 and 21 each having at its lower end a similar foot member 22 and each of which front legs is joined to one another by a front transverse member 23.

The upper ends of the front frame legs 20 and 21 are respectively connected at its upper end by a pivot 24 and 25 to an arm rest, respectively, 26 and 27. Each of the arm rests includes or has a depending flange 28 and 29 through which the pivots 24 and 25, respectively, extend. The rear frame legs 16 and 17, likewise have their upper ends pivotally connected at 30 and 31 to their respective arm flange 28 and 29.

The rear ends of the arms 26 and 27 are, respectively, through its depending flange 28 or 29 pivotally connected at 32 and 33 to the chair back, indicated in general by the reference numeral 34, said connection being specifically with the chair back vertical side members 35 and 36. The chair seat, indicated in general by the reference numeral 37, likewise includes side frame members 38 and 39 which are in substantial alignment with the chair back vertical sides 35 and 36, as is well-known in this type of construction and as will subsequently be pointed out. The front legs 21 and 22 are respectively pivoted to the seat side members 38 and 39 by means of pivots 40 and 41.

The forward ends of the chair seat sides 38 and 39 are spaced from one another by a cast or extruded member 42 preferably formed of aluminum for lightness and resistance to the elements as this type of furniture is frequently used out of doors.

Figures 2, 7, 8, 9, 10:
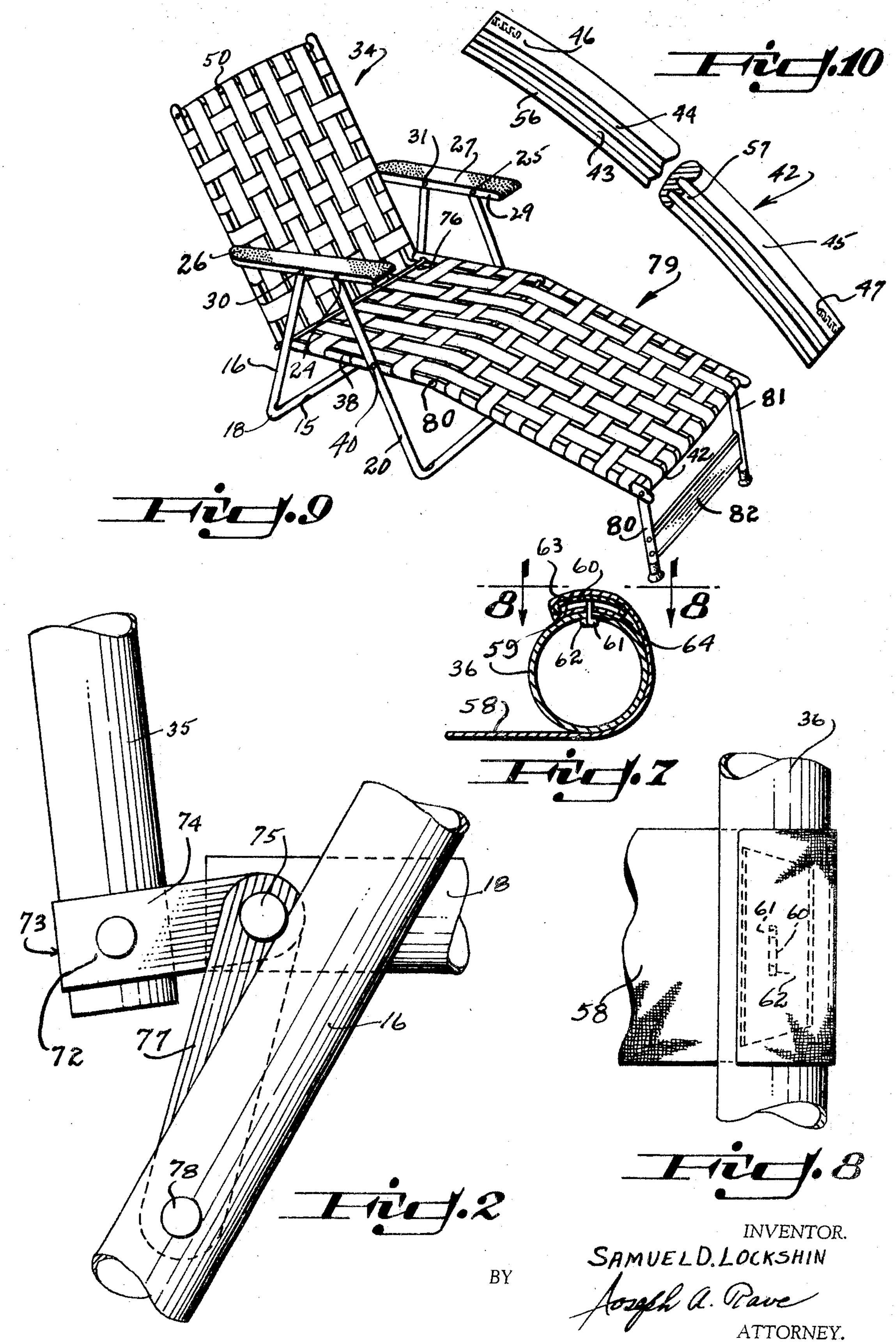
FIG. 2 is an enlarged, fragmentary, elevational view of the joint of the back and seat to one another whereby the said chair may be folded for storage, said view being as seen from line 2—2 on FIG. 1.
FIG. 7 is a transverse, sectional view through one of the vertical frame members of the back as seen from line 7—7 on FIG. 1.
FIG. 8 is a plan view of the attachment of the web ends by clip means as seen from the rear side of the chair back or as seen from line 8—8 on FIG. 7.
FIG. 9 is a a perspective view of a chaise of the metal aluminum, frame and interlaced webbing strips embodying the improvements of the present invention.
FIG. 10 is a perspective view of the flexible strip ends securing bar of the present invention and forming a detail of the invention.

The said transverse member 42, see FIGS. 3 and 10, is provided longitudinally thereof with a first groove 43 utilized as will presently be made clear, for securing the ends of the seat webbing straps thereto. The said member is provided adjacent the groove 43 with a second groove 44 for reducing the weight of the transverse member 42 and for a purpose subsequently to be made clear. Outwardly of said second groove 44 the transverse member 42 is provided with a relatively thickened portion 45 extending from end to end to provide said transverse member with the necessary strength to support the weight of a person occupying the seat 37. The said transverse member portion 45 is provided at its opposite ends with threaded sockets 46 and 47, respectively illustrated in FIGS. 4 and 5. The said threaded sockets 46 and 47 have their axes substantially parallel with the axes of the slot or groove 43 and said sockets, respectively, receive securing screws 48 and 49, for a purpose subsequently to be pointed out.

In practice, the said elongated member 42 may be slightly downwardly bowed or arched from end to end when used at the seat forward edge so that in using the chair the said forward end of the seat conforms to the contour of the user's legs and the least amount of discomfort is caused the user. In this instance the threaded sockets 46 and 47 would have their axes parallel with the groove when viewed downwardly from the top or upwardly from the bottom thereof and the said threaded sockets are slightly angularly related to the axis of the transverse member when viewed from the back or front thereof, said angularity in no wise interferes with the construction since the member 42, at its opposite ends has sufficient thickness to compensate for this slight angularity.

In practice the upper end or top of the back is provided with a member 50, similar in construction in all respects to the member 42, and its curved or arched condition extends outwardly, again, to accommodate the contour of the person using the chair.

In practice, that is, assembling, the chair or chaise parts, that is, the said forward member 42 of the chair seat 37 and rearward member 50 of the chair back 34 are respectively placed, each, to have its groove 43 upwardly and whereupon the ends 51 of each horizontal seat fabric strip 52 is placed across the groove 43 with its free edge 53 in the transverse member 42 second groove 44 and the other ends of said flexible strips 52 forming the back 34 are similarly arranged with respect to the upper transverse member 50 across its groove 43 and with their free edges in the upper member second groove 44.

After each of the ends of each fabric strip has been arranged as just outlined a cylindrical rod or other fastening member 54 is disposed over the said portions or ends 51 of the said flexible strips and forced into the groove or slot 43 with the said strip beneath the rod and clamped between itself and the inner wall 55 of the groove. The said groove, in each transverse member is formed as shown clearly in FIG. 3 and includes an outwardly extending longitudinal projection 56 and an inward longitudinal projection 57 defining or forming a wall between the transverse member first groove 43 and second groove 44. As further seen in FIG. 3, the said transverse member is then, in effect, rolled on itself to bind the portion of the fabric strips end 51, just behind its free edge 53, between itself and the inner lug 57 of the transverse member.

It should be noted that this binding of the ends of the fabric strips is in addition to the clamping of said ends between the fastening member or rod 54 and the inner faces of the longitudinal projections 56 and 57, which projections have their inner faces positioned with respect to one another to be slightly less than the diameter of the rod or fastening or securing member 54 and twice or double the thickness of the fabric strip. The said assembled transverse members 42 and 50, the ends of the fabric strips 52, and the securing rods 54 together with the said fabric strips are then constituting a unitary construction assembly forming in final assembly a part of the seat and back of the chair.

The said chair seat includes, as noted above, side frame members 38 and 39 and have, respectively, extending thereabout and between them the cross or transverse lengths of fabric strips 58 which as shown in FIG. 7 are respectively secured by means of the usual securing clip 59. The said securing clip as is wellknown has an overlying body portion 60 from which depends flexibly extensible legs 61 and 62 which pass through an end 63 of the said transverse flexible fabric strips 58 with said legs 61 and 62 also passing through an opening 64 to one wall of a side member 38 or 39 and which are hollow tubes as seen in FIG. 7. The said flexible legs after passing through the opening 64 engages the under surface of the opening to secure the same in place. This particular connection is known as a "fabric to tube" connection and is well-known.

The transverse members 42 and 50 are respectively utilized to maintain and lock the outer ends of the seat side members 38 and 39 in spaced relation as well as lock in spaced relation the upper ends of the back side members 35 and 36. This is accomplished, see FIGS. 4 and 5, and wherein the seat side member 38 is provided with an opening or aperture 65 through its inner surface while the side member 39 is provided with a similar opening 66.

The cylindrical rod, fastening, or securing bar 54 is made of a length to extend, approximately, between the inner surfaces of the said seat side members 38 and 39, wherefore, as seen in said FIGS. 4 and 5, the locking or securing bar 54 after securing the ends of the individual fabric strips to the transverse member 42 are inserted through the chair sides 38 and 39, openings 65 and 66, respectively.

The said transverse bar 42 is retained in operative positions through the screws 48 and 49, supra, which respectively extend through the seat side members 38 and 39 through aligned apertures 67 and 68, outwardly of the apertures 65 and 66 therein. The said seat side members 38 and 39 project outwardly of the said seat per se, 37, and are rounded as at 69 and 70, respectively, as illustrated in FIGS. 4 and 5.

The securement of the transverse member 50 to the upper ends of the back side members 35 and 36 is identical in all respects and the said top transverse member 50 is retained in operative operation by screws, one of which is illustrated in FIG. 1 and indicated at 71, the same as the front end of the seat.

The said back side members 35 and 36 are pivotly connected to the seat side members 38 and 39 and each of which connection, see FIG. 2, takes the usual or accepted pivot connection, including a U-shaped member 72 having its base rounded, as at 73, and embracing the lower end of a vertical back tubular member 35 or 36. The free ends 74 of the arms of the said connecting U-shaped member 72 embraces the rear or back end of the said seat side members, such as 39, and the said U-shaped member arms 74 have aligned therein apertures extending therethrough a pivot 75 which not only passes through the U-shaped arms free ends 74 but also through an aperture in the seat side members, or tubes, specifically through the side member 39. The pivot 75 is in reality a circular pivot bar 76, see FIG. 1, that passes entirely across the seat and back to define the rear end of a seat, per se, and the bottom of the back, per se.

The said pivot bar 76 on the outer sides of the sides of the U-shaped connecting members 72 and seat side members 38 and 39, seat side member 39, for example, see FIG. 2, extends through an opening at the upper end of a link 77 which has its other end pivoted at 78 to the rear leg member 16 at a point below the seat.

By this construction the leg 16 may be actuated about the pivot 78 upon the elevation of the arm rests 25 and 26 and at the same time the seat is upwardly raised and folded against the back. This construction is not new in the present application but is of convenience.

In the chaise lounge substantially similar connections are effected except that at the forward end of the seat, the lounge or supporting portion 79 is pivoted. The said forward or lounge portion 79 has its rear end pivoted at 80 to the said forward end of the seat and the outer end of the said extending lounge portion 79 in turn has pivoted to its outer end depending legs 70 and 71 which are connected to one another against lateral displacement by a connecting member or plate 72.

The connecting and securing bar 42, as illustrated in FIG. 10 while perfectly operable with respect to holding the flexible strips in position is, despite the lightening groove 44 therein, is relatively heavy and relatively expensive to produce due to the necessity of forming the threaded sockets 46 and 47 in the opposite ends thereof.

Figure 11:
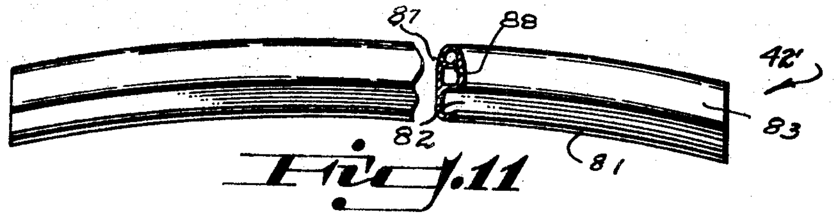
FIG. 11 is a fragmentary, perspective view of a modified securing bar for securing the ends of the flexible strips in operative position.

The modified connecting and securing bar in FIG. 11 is a truly aluminum extrusion and may be formed in relatively large and continuous lengths and require no additional machining other than to cut the same to desired lengths to make the same operative. As seen in FIG. 11 and more clearly in the cross-section in FIG. 12 the said spacing and securing bar 42' is provided with a lip 81 defining one side of a channel 82 that has its other side formed by the relatively wide body portion 83 of the bar. The body portion 83 of the spacing and securing bar 42' is hollow as indicated at 84 and extends the full length of the extrusion or bar. The groove or channel 82, similar to the groove or channel 43 in the spacing and securing bar, FIG. 10, is just wide enough to accept the securing member or rod 54 and clamp the portion or end 51 of the web 52 extending thereabout.

Figure 12:
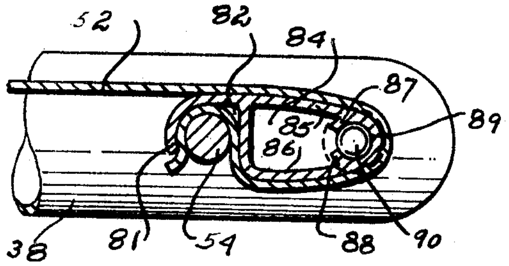
FIG. 12 is an enlarged view, similar to FIG. 3 showing the securing bar of FIG. 11 in operative position with the end of the flexible strip in operative position, it being understood that the two ends of said flexible strip being substantially similarly secured.

As seen in FIGS. 11 and 12 the connecting or securing bar 42' has inwardly extending from the upper and lower walls 85 and 86 thereof, forming the hollow 84, lugs 87 and 88. The said lugs 87 and 88 have their inner surface arcuate and as an extension of the arcuate face 89 of the inner end of the spacing and securing bar 42'.

In operation the lugs 87 and 88 in cooperation with the rounded inner surface 89 of the end of the spacing or securing bar provides a substantially circular opening for the securing screw 90. The said screw 90 is of the self-threading, or cutting, variety wherefore it makes its own thread as the said screw is being driven home after extending through an adjacent chair or chaise frame member such as 39, supra.

Figure 14:
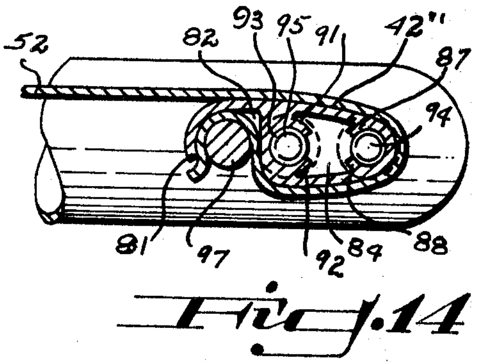
FIG. 14 is an enlarged view, similar to FIGS. 3 and 12 showing the securing bar of FIG. 13 in operative position with the ends of the flexible strip in operative position.
Figure 13:
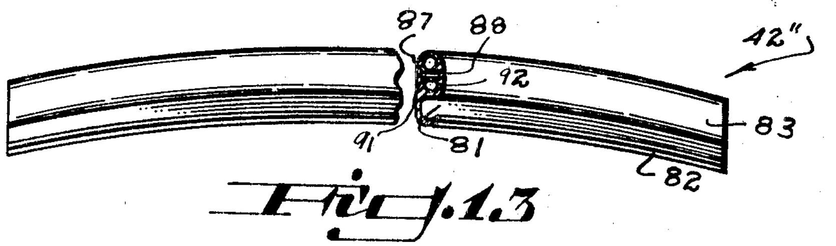
FIG. 13 is a fragmentary, perspective view of a further modification of the securing bar for securing the ends of the flexible strip in operative position.

The modification of the said connecting spacing or securing bar 42'' in FIGS. 13 and 14, similar to the said connecting, spacing or securing bar 42' is provided with the channel 81 between the flange 82 and the hollow body portion 83. The said body portion 83 is hollow as at 84, see FIG. 14, and has the screw thread forming lugs 87 and 88 inwardly projecting to form the screw aperture. In addition the said connecting, spacing, or securing bar 42'' has projecting inwardly thereof from the inner portion or wall extending longitudinally of the locking groove 82, lugs 91 and 92 each having its inner surface as a continuation of a circular inner surface 93 of the said wall constituting the inner wall of the locking groove 81 and which wall is opposed to the said outer wall inner arcuate wall surface 89.

By this construction a pair of securing screws, similar in all respect to the screw 90, and indicated in FIG. 14 by the reference numerals 94 and 95, each, as above set forth, have the self-cutting thread mechanism. It is understood that each of the securing screws 90, 94 and 95, as well as the securing screws 48 and 49, supra, is provided with a head 96 to engage the outer surface of a frame member.

As will be presently pointed out the modified spacing, securing, or connecting bar 42'' of FIGS. 13 and 14 are utilizable with a securing rod 97 which is of a length only not greater than the width of the web itself.

Figure 17:
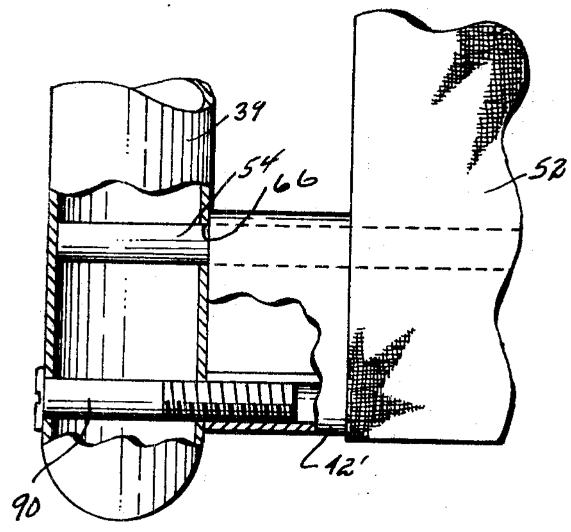
FIG. 17 is a fragmentary view, similar to FIG. 4, of the connections of the chair or chaise sides and securing bar, or frame member, of FIGS. 11 and 12, after the same have been connected and as seen from the top or upper surface, thereof.
Figure 18:
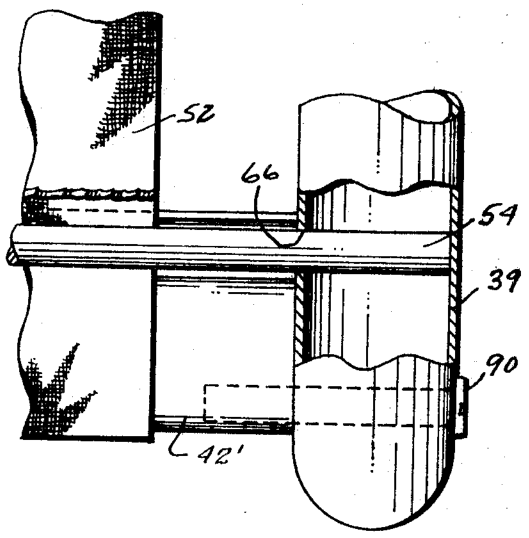
FIG. 18 is a fragmentary view of the parts of FIG. 17 as seen from the bottom or undersurface of the parts, a corner of a chair or chaise seat, or back, and side frame member.

As illustrated in FIGS. 17 and 18 the continuous securing rod 54 is forced into the groove 82 of the spacing and securing bar 42' with each of the said longitudinal flexible webs 52 having its end 53 in operative position and with the said securing rods 54 having the projecting ends thereof, supra, inserted into the openings 66 in seat side members 38 and 39 or the back side members 35 and 36. At this time the screws 90 are entered into the opposite ends, or the screw sockets, of the said securing and spacing bar 42' and thereby securing the parts against inadvertent independent movement.

Figures 19, 20, 24:
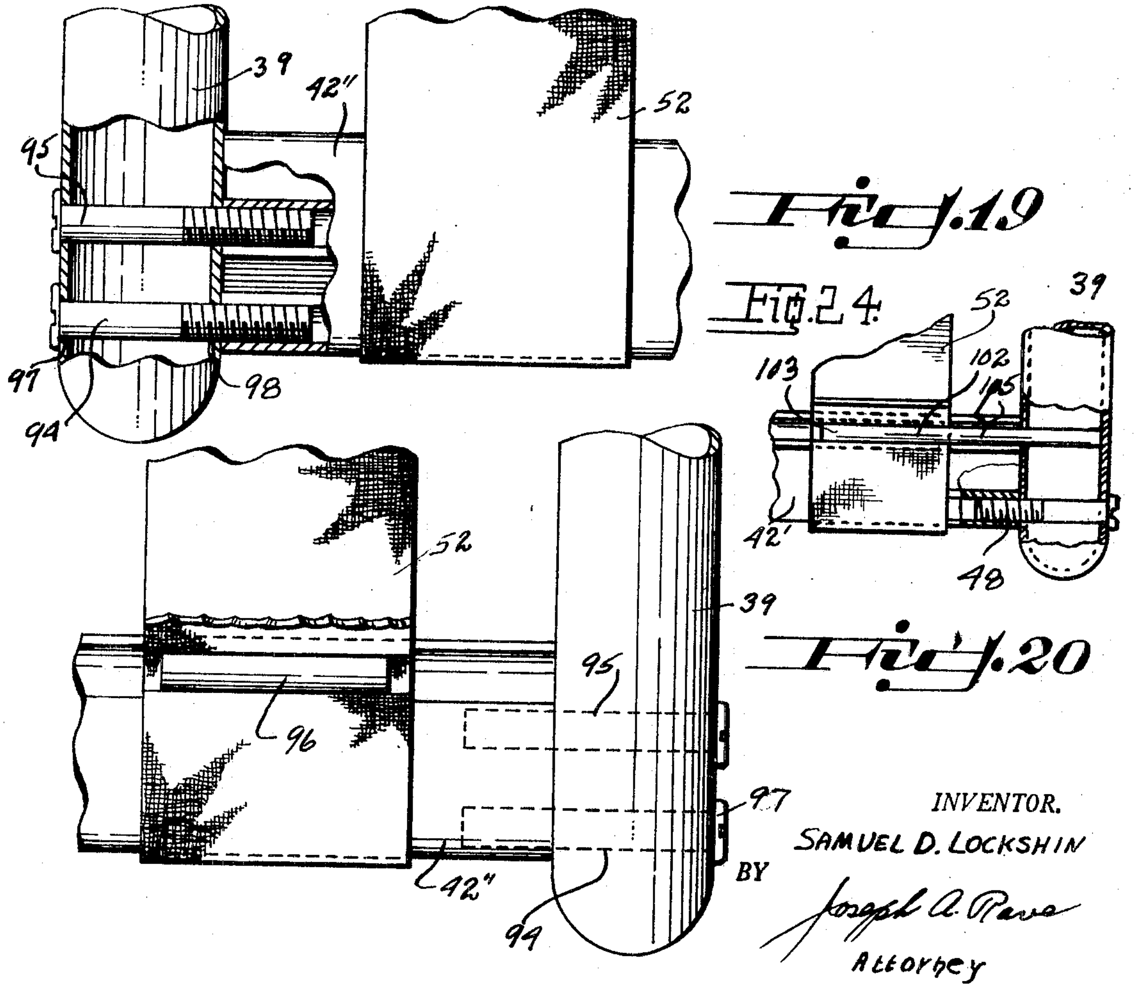
FIG. 19 is a fragmentary view of, similar to FIGS. 4 and 17, of the connections of the chair or chaise sides and securing bar, or frame member, FIGS. 13 and 14, after the same have been connected and as seen from the top, or outer surface, thereof.
FIG. 20 is a fragmentary view of the parts of FIG. 19 as seen from the bottom or undersurface of the parts, a corner of a chair or chaise seat, or back and side frame member.
FIG. 24 is a view similar to FIG. 20 illustrating a further modification embodying the basic thoughts of the present invention.

The connection of these parts as illustrated in FIGS. 19 and 20 show both screws 94 and 95 extending through aligned apertures 98 and 99 through the said frame members 38 and 39. As illustrated in FIG. 20 the said securing rod 97 is of a length slightly less than the width of a flexible webbing strip 52.

As noted above in connection with the securing and spacing bar 42 the said screws 48 and 49 and the continuous or single securing bar 54 are necessary to prevent the said securing and spacing bar 42 from rotating on the axis of either of the screws 47–48 or the rod 54. This same situation obtains with the modified spacing and securing bar 42' of FIGS. 11, 12, 17 and 18, in that a single self-tapping screw 90 is employed with the said continuous securing rod 54. In, however, the modification in FIGS. 13, 14, 19 and 20, since the securing rod 97 does not extend beyond the flexible webbing material itself use is made of both screws 94 and 95 to prevent rotation of the said modified connecting, spacing, or securing bar 42".

The modification illustrated in FIG. 20 contemplates, as just pointed out, supra, the use of the securing or holding rods 42" each of a length equal to the widths of the webbing strips 52, or at least of a length not much less than the width of said webbing strip.

This arrangement, as noted above, and illustrated in FIGS. 19 and 20, requires, or at least make it desirable, to use two fastening screws, such as 94 and 95, for securing the spacing and securing member 91 in operative position and against rotation when in use about either of the said screws.

It has been found that if the said securing rod 96 were replaced by the securing rod 102 of FIG. 24 the same results would be obtained and only a single securing screw would be necessary. In other words, the securing rod 102 has body portion 103, similar in all respects to the diameter and length of the entire securing rod 96 and an extending portion 104 which spans the distance between either first flexible strip 52, laterally, of the chain and the adjacent frame member, heat side member 39 for example, or back side member 36.

In other words, by using the securing or fastening rod 102 of FIG. 24 for each of the outermost, laterally positioned, seat-back flexible webbing strips the same would be securely held in position and only the forwardmost securing or fastening screw 46 (FIG. 4) would be needed or employed to secure the spacing and receiving rods 42, 42' and 42" in operative position.

It is obvious that the extending portion 104 of the combination securing rod 102 may be of a smaller dimension, diameter, than the body portion 103, if desired, but must, for best results, extend into the hollow interior of the chair or chaise front or back side members.

The method of securing the free ends of the flexible strips 52 as illustrated in FIG. 3, indicates that the extreme end or edge 53 of the said flexible members may enter the space or groove 44 and be additionally secured in position by the bonding of the said flexible strip body portion on the end 53 thereof against the tongue 57 between the grooves 43 and 44.

It has been found that the locking rod 54 can secure the said end 53 of the flexible strip 52 in position without being folded on itself and such arrangement is illustrated in FIGS. 12 and 14 for the modified spacing and securing bars 42' and 42" and this same arrangement may be effected in connection with the spacing and securing bar 42.

Figure 15:
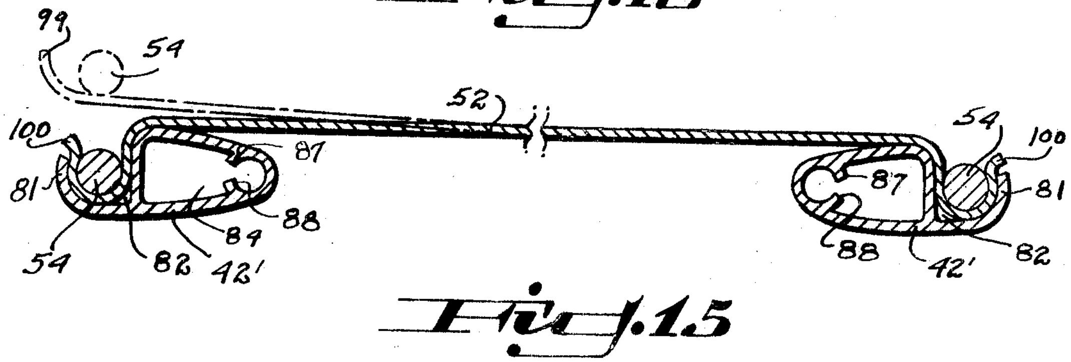
FIG. 15 is a view showing the method of arranging the parts, the securing bars, the flexible strips and securing means, the first in the method, before connection with the remaining parts of a chair or chaise.
Figure 16:
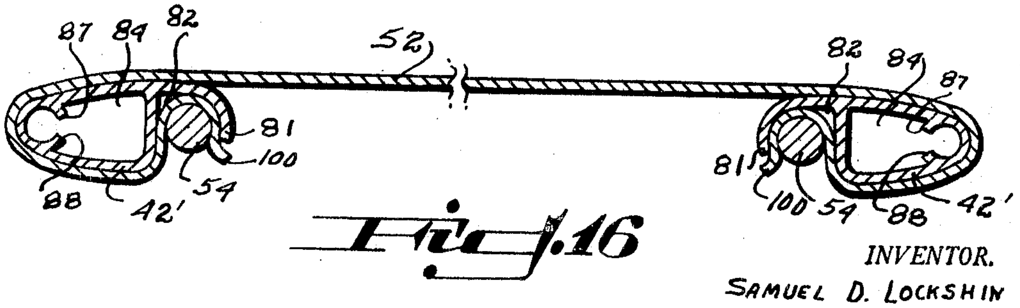
FIG. 16 is a view of the next step, from that in FIG. 15, in the assembly of the flexible strips and bars prior to connection with the remaining parts of the chair or chaise.

Whether the relatively solid securing and spacing bar 42 of FIG. 10, or the relatively hollow spacing and securing, or connecting bars 42' and 42", respectively, in FIGS. 11 and 13, are employed the same method of assembling the parts or manufacturing the chair or chaise would ensue and this method of construction or assembly in FIGS. 12 and 14 is illustrated in FIGS. 15 and 16. As there illustrated and strictly for the purpose of description, it is assumed that the end of the flexible strip illustrated in dot and dash lines at 100 is the end of a large roll of this material and that the securing and spacing bars 42, bar 42' and bar 42" are separated the proper distance from one another, that is, as garden or lawn chair and chaise are presently manufactured the longitudinal strips 52 are continuous from the top of the back to the front of the seat and the said free ends 100 of the said flexible strips are laid across one of the spacing securing bar 42, bar 52' or bar 42" when disposed in a position of that when in operative position. The said securing rod 54 is then pressed into the groove of the said securing and spacing bar, thereby fastening one end of the said strip. The said flexible strips, that is the rolls of strip, are then extended across the second of the said spacing and securing bars 42, 42' and 42" again in the position reverse to that in which it is normally used. At this time the second of said securing rods 54 would be inserted and either then or previously the second end of the said flexible strips, indicated in FIGS. 15 and 16 by the reference numeral 101, then result. The assembler of the chair or chaise would then merely rotate or roll each of the spacing bars on itself and toward one another whereupon the parts would have the positions illustrated in FIG. 16 and would then be ready for securement in the positions illustrated for the said solid bars at the top and bottom, respectively, of the chair or chaise, back and seat, FIGS. 1 and 9.

Figure 22:
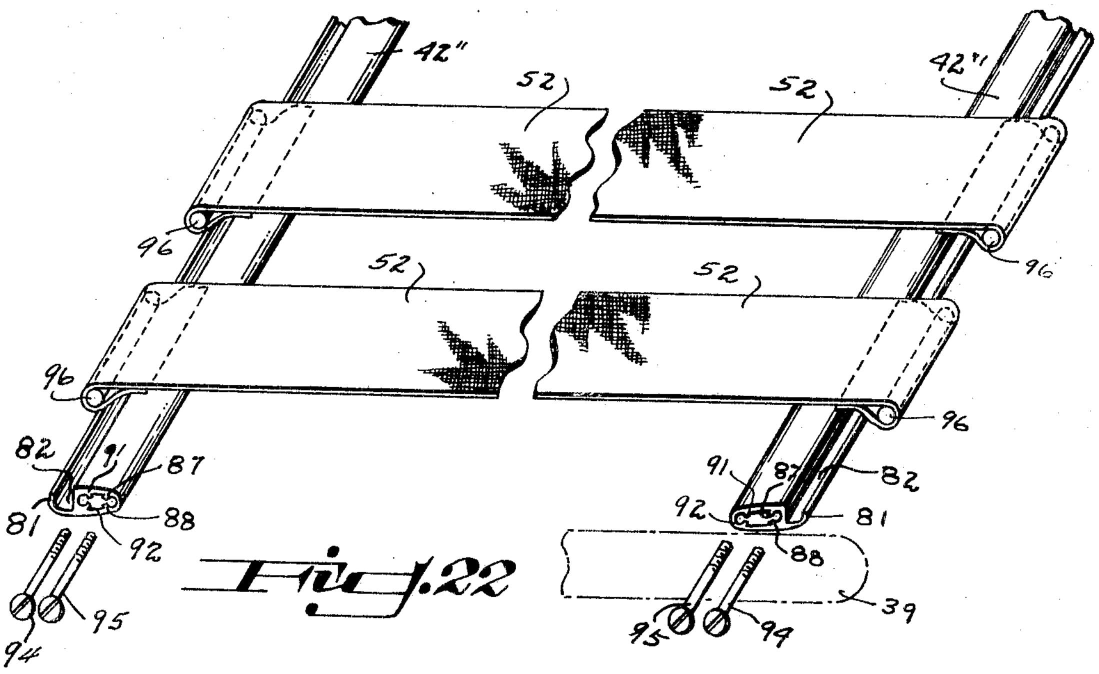
FIG. 22 is a fragmentary, perspective view of the relationship of the parts, flexible strips, frame or connecting bars and securing means for securing the flexible strips to the said bars and illustrating the securing and connecting bars of FIG. 13.
Figure 23:
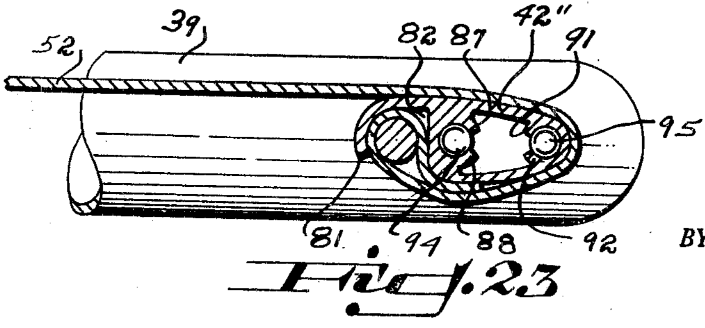
FIG. 23 is a cross-sectional view similar to FIG. 14, showing the parts, particularly the securing and connecting bar of FIG. 13 with the flexible strips in their operative positions.

In order to fold or arrange the parts to have the free end 53 of the flexible strips 52, as illustrated in FIGS. 3 and 23, to be under the strip body portion, the reverse operation or method is used from that illustrated in FIGS. 15 and 16. This method whether of a single clamping bar for all of the strips of a garden furniture chair or chaise or whether the individual securing means for each strip is employed as in FIG. 22.

This method of securing the parts to one another contemplates the connecting or securing bars 42, 42' and 42" would be initially arranged in reverse relation from one another, as seen in FIG. 15, that is, the grooves 43 or 82 would be positioned upwardly but opposed to or projecting toward one another, which is the reverse of this relationship as illustrated in FIG. 15. The free ends of the rolls of strips would then be positioned with respect to the said connecting or securing bars so that the said free end, initially 100, and subsequently 101, would lie on the hollow body portions of these parts instead of therebeyond, as illustrated in said FIG. 15.

Figure 21:
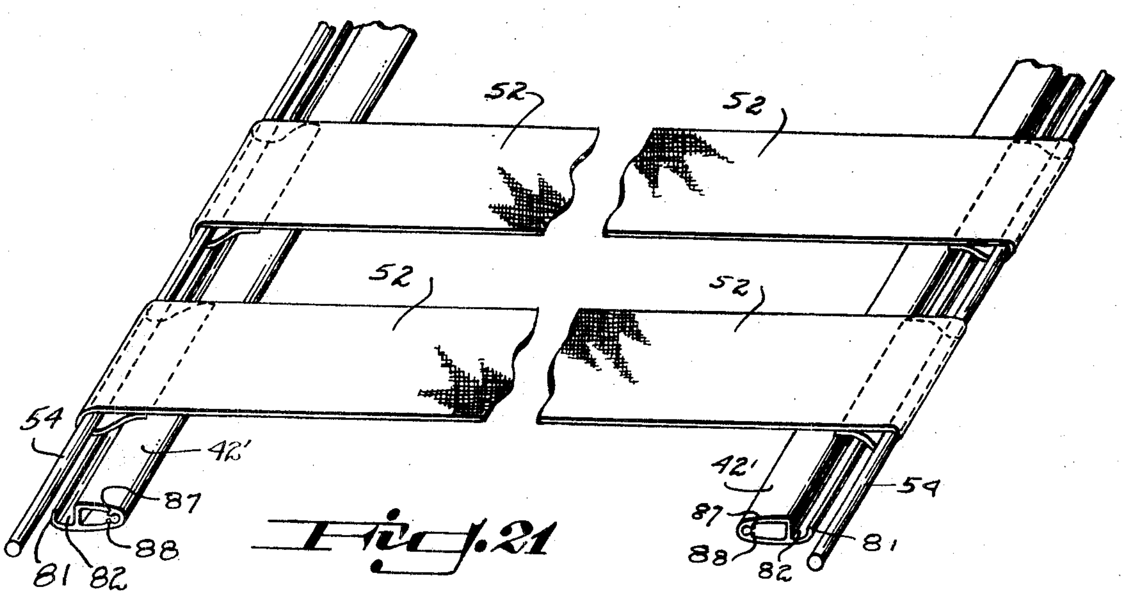
FIG. 21 is a fragmentary, perspective view of the relationship of the parts, flexible strip, frame or connecting bars and securing means for securing the flexible strip to the said bars and illustrating the securing end connecting bars of FIG. 11.

The arrangement of the single or continuous locking rod 54, or the relatively short locking rods 96, would then be pushed home which in effect would position the parts as illustrated in FIGS. 21 and 22.

After the pushing or insertion of the said locking rods of FIGS. 21 and 22 into their locking grooves and the rotation of the said connecting members on the flexible strips 52 would result in the parts having the relationship in FIG. 23.

However, with the parts in the final positions as illustrated in FIG. 16 the left hand connecting and securing bar 83 would be the top bar of a chair or chaise back while the right hand connecting and securing bar 83 would be the outer end of the seat of said piece of furniture. Upon the assembling of the parts as in FIGS. 21 and 22 it would be necessary to then reverse this assembly so that the right hand connecting and securing member or bar becomes the top of the chair back while the left hand member the front of the seat; that is, as noted above, the reverse of the utilization of the parts of FIG. 16.

From the foregoing it will be noted that there has been provided an outdoors chair or lounge of the foldable type and relative to which the longitudinal flexible webbing strips extend with their opposite ends connected simultaneously to the back upper end and seat or chaise outer end without the use of individual securing clips as has been the practice in the past.

Otherwise, it is respectfully submitted that the chair or lounge of the present invention accomplishes the objects initially set forth.

What is claimed is:

1. In an article of furniture of the class described the combination of a seat, per se, and a back, per se, each said seat and back including a frame made up of side and spacer members, a plurality of lengths of flexible material webs interlaced with one another and extending between and secured to said side members and said spacer members, means hingedly connecting to one another the adjacent ends of said seat and back frame side members, means for securing one of said frame members and said flexible material web ends to one another, including, a clamp bar cooperating with said frame member for clamping the ends of the flexible material individual webs to said frame member against inadvertent separation including one of said frame members and said clamping bar having a groove therein to receive the other and with the ends of the flexible material webs therebetween and wherein the transverse dimension of the groove is less than the similar dimension of either the clamp bar or frame member and web, in combination, and wherefore the interconnection within the groove of the clamp bar and member with the individual web ends secure the said web ends between them.

2. In an article of furniture of the class described as set forth in claim 1, characterized by, said clamping bar being circular in cross-section and said frame member having a groove therein receiving the clamping bar with the flexible material web ends in the groove and whereby said clamp bar, said frame member and said flexible material ends are secured against inadvertent separation.

3. In an article of furniture of the class described as set forth in claim 1, characterized by, said connection of one of said frame members and flexible members webs including a spacer member for one of the back and seat side members, said spacer member having a groove therein receiving the ends of the flexible material webs and the said groove in the spacer member also receiving the clamp bar with said groove having a transverse dimension less than the similar dimension of either the clamp bar or frame member and web in combination and wherefore the securing the ends of the flexible material webs to said spacer bar is effected.

4. In an article of furniture of the class described as set forth in claim 1, characterized by, said connection of one of said frame members and flexible members webs including a spacer member for one of the back and seat side members, said spacer member having a groove therein receiving the ends of the flexible material webs and the said groove in the spacer member also receiving the clamping bar for securing the ends of the flexible material webs to said spacer member, said spacer member having the groove therein extending the full length thereof, and said cooperating clamp bar having a length at least as long as the spacer member and its groove for simultaneously securing the flexible material web ends in said groove.

5. In an article of furniture of the class described as set forth in claim 1, characterized by, said connection of one of said frame members and flexible members webs including a spacer member for one of the back and seat side members, said spacer member having a groove therein receiving the ends of the flexible material webs and the said groove in the spacer member also receiving the clamping bar for securing the ends of the flexible material webs to said spacer member, said spacer member having the groove therein extending the full length thereof, said cooperating clamp bar having a length at least as long as the spacer member and its groove for simultaneously securing the flexible material web ends in said groove, and means securing the spacer member and its clamping bar to the frame side members for securing said frame members to one another in operative positions.

6. In an article of furniture of the class described as set forth in claim 1, characterized by, said connection of one of said frame members and flexible members including a spacer member for one of the back and seat side members webs, said spacer member having a groove therein receiving the ends of the flexible material webs and the said groove in the spacer member also receiving the clamping bar for securing the ends of the flexible material webs to said spacer member, said spacer member having the groove therein extending the full length thereof, said cooperating clamp bar having a length at least as long as the spacer member and its groove for simultaneously securing the flexible material web ends in said groove, said spacer member having abutted against its outer edges the frame side members, said cooperating clamping bar having a length greater than the spacer with its ends beyond the spacer bar, said cooperating side members each having an aperture therein receiving the projecting ends of the clamping bar, and means cooperating with the spacer member and adjacent side frame members for securing same against inadvertent displacement with respect to one another.

7. As an article of manufacture for use with porch or garden furniture a spacer bar including means receiving the ends of a plurality of flexible member webs, and independent clamp means cooperating with said spacer bar constituting the sole means for securing each flexible member web end to the spacer bar.

8. As an article of manufacture for use with porch or garden furniture a spacer bar as set forth in claim 7, characterized by, said receiving means in said spacer bar being in the form of a groove longitudinally of the spacer bar, and said clamping means cooperating with said spacer bar being in the form of a clamp rod insertable within the groove.

9. As an article of manufacture for use with porch or garden furniture a spacer bar as set forth in claim 7, characterized by, said receiving means in said spacer bar being in the form of a groove longitudinally of the spacer bar, said clamping means cooperating with said spacer bar being in the form of a clamp rod insertable within the groove, and said clamp rod having ends projecting laterally of the spacer bar for mounting and positioning the spacer bar.

10. As an article of manufacture for use with porch or garden furniture a spacer bar as set forth in claim 7 characterized by, said receiving means in said bar being in the form of a groove provided by a flange extending the length of the bar, and a bar body portion likewise extending the length of the bar and spaced from the groove, said bar body portion having formed in its opposite ends mounting screw sockets.

11. As an article of manufacture for use with porch or garden furniture a spacer bar as set forth in claim 7 characterized by, said receiving means in said bar being in the form of a groove provided by a flange extending the length of the bar, and a bar body portion likewise extending the length of the bar and said body portion being hollow throughout its length, and lugs inwardly projecting adjacent one end of said body portion forming a screw receiving socket.

12. As an article of manufacture for use with porch or garden furniture a spacer bar as set forth in claim 7 characterized by, said receiving means in said bar being in the form of a groove provided by a flange extending the length of the bar, and a bar body portion likewise extending the length of the bar, said body portion being hollow for the length thereof, and lugs inwardly projecting from the upper and lower wall of the body portion hollow portion and inwardly of each end thereby providing screw sockets at the ends of the body portion.

13. In an article of manufacture of the class described as set forth in claim 1 characterized by, said securing means for the ends of the flexible material webs to the spacing and securing frame member consisting in an individual securing rod for each said flexible material web end, and means extending outwardly of the said securing rod from the outermost webs securing the spacing and securing member in operative position.

14. In an article of manufacture of the class described as set forth in claim 1 characterized by, said securing means for the ends of the flexible material webs to the spacing and securing frame member consisting in an individual securing rod for each said flexible material web end, and an integral extension from said outermost securing rod cooperating with the adjacent spacing and securing frame member to prevent rotation or displacement of the said spacing and securing member.

References Cited

UNITED STATES PATENTS

| | | | |
|---|---|---|---|
| 1,246,544 | 11/1917 | Chassaing | 160—392 X |
| 2,474,597 | 6/1949 | Shwarzowsky | 297—441 |
| 2,564,915 | 8/1951 | Nelson | 297—441 X |
| 2,839,126 | 6/1958 | O'Neill | 160—392 |
| 3,099,478 | 7/1963 | Pearlstine | 297—29 X |
| 3,114,572 | 12/1963 | Hopkins | 297—33 |
| 3,399,926 | 9/1968 | Hehn | 297—457 |

CASMIR A. NUNBERG, Primary Examiner

U.S. Cl. X.R.

160—371; 297—452